US009489950B2

(12) United States Patent
Larcher et al.

(10) Patent No.: US 9,489,950 B2
(45) Date of Patent: Nov. 8, 2016

(54) METHOD AND SYSTEM FOR DUAL SCORING FOR TEXT-DEPENDENT SPEAKER VERIFICATION

(71) Applicant: Agency for Science, Technology and Research, Singapore (SG)

(72) Inventors: Anthony Larcher, Singapore (SG); Kong Aik Lee, Singapore (SG); Bin Ma, Singapore (SG); Thai Ngoc Thuy Huong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 100 days.

(21) Appl. No.: 13/900,858

(22) Filed: May 23, 2013

(65) Prior Publication Data
US 2013/0325473 A1    Dec. 5, 2013

(30) Foreign Application Priority Data
May 31, 2012   (SG) .................................. 201204003

(51) Int. Cl.
  *G10L 17/10*    (2013.01)
  *G10L 17/12*    (2013.01)
(52) U.S. Cl.
  CPC ............... *G10L 17/10* (2013.01); *G10L 17/12* (2013.01)
(58) Field of Classification Search
  CPC .............................. G10L 17/12; G10L 1/107
  USPC ........................................ 704/249, 239, 256
  See application file for complete search history.

(56) References Cited

U.S. PATENT DOCUMENTS

| | | | | |
|---|---|---|---|---|
| 4,694,493 A * | 9/1987 | Sakoe | .......................... | 704/247 |
| 5,983,174 A * | 11/1999 | Wong et al. | .................. | 704/228 |
| 6,094,632 A * | 7/2000 | Hattori | .......................... | 704/239 |
| 6,618,702 B1 * | 9/2003 | Kohler et al. | ................ | 704/250 |
| 6,684,186 B2 * | 1/2004 | Beigi et al. | ................... | 704/246 |
| 6,879,968 B1 * | 4/2005 | Hayakawa et al. | ............. | 706/20 |
| 7,177,808 B2 * | 2/2007 | Yantorno et al. | ............. | 704/246 |
| 7,216,075 B2 * | 5/2007 | Takagi | .......................... | 704/233 |
| 7,222,072 B2 * | 5/2007 | Chang | .......................... | 704/250 |
| 7,539,616 B2 * | 5/2009 | Zhang et al. | ................. | 704/233 |
| 7,895,192 B2 * | 2/2011 | Mehta et al. | ................. | 707/719 |
| 2005/0021337 A1 * | 1/2005 | Kwon | .......................... | 704/256 |

(Continued)

OTHER PUBLICATIONS

Li et al., "Automatic Verbal Information Verification for USer Authentication," IEEE Transactions on Speech and Audio Processing, Sep. 2000, vol. 8, No. 5, pp. 585-596.*
Becker et al., "Automatic Forensic Voice Comparison Using Recording Adapted Background Models", 39th International Conference: Audio Forensics: Practices and Challenges, Jun. 2010, p. 6-2.*

(Continued)

*Primary Examiner* — Oluwadamilola M Ogunbiyi
(74) *Attorney, Agent, or Firm* — Schwegman Lundberg & Woessner, P.A.

(57) ABSTRACT

Embodiments of systems and methods for speaker verification are provided. In various embodiments, a method includes receiving an utterance from a speaker and determining a text-independent speaker verification score and a text-dependent speaker verification score in response to the utterance. Various embodiments include a system for speaker verification, the system comprising an audio receiving device for receiving an utterance from a speaker and converting the utterance to an utterance signal, and a processor coupled to the audio receiving device for determining speaker verification in response to the utterance signal, wherein the processor determines speaker verification in response to a UBM-independent speaker-normalized score.

16 Claims, 9 Drawing Sheets

(56) References Cited

U.S. PATENT DOCUMENTS

| | | | |
|---|---|---|---|
| 2006/0111905 A1* | 5/2006 | Navratil et al. | 704/256.7 |
| 2008/0195389 A1* | 8/2008 | Zhang et al. | 704/246 |
| 2008/0222722 A1* | 9/2008 | Navratil et al. | 726/21 |
| 2010/0131273 A1* | 5/2010 | Aley-Raz et al. | 704/247 |
| 2011/0144990 A1* | 6/2011 | Hoory et al. | 704/235 |
| 2012/0084087 A1* | 4/2012 | Yang et al. | 704/246 |
| 2012/0259638 A1* | 10/2012 | Kalinli | 704/270 |

OTHER PUBLICATIONS

Larcher et al., "From GMM to HMM for Embedded Password-Based Speaker Recognition", 16th European Signal Processing Conference, Aug. 25-29, 2008, pp. 1-5.*

Schwartz, "A Text-Independent Speaker Recognition System," Speaker Recognition Proposal, University of Maryland, Oct. 2, 2011. Retrieved from: <http://www2.math.umd.edu/~rvbalan/TEACHING/AMSC663Fall2011/PROJECTS/P9/Speaker-RecognitionProposalSlides_CatieSchwartz.pdf>.*

* cited by examiner

METHOD AND SYSTEM FOR DUAL SCORING FOR TEXT-DEPENDENT SPEAKER VERIFICATION

PRIORITY CLAIM

This application claims the benefit of priority of Singapore Patent Application No. 201204003-6, entitled "METHOD AND SYSTEM FOR DUAL SCORING FOR TEXT-DEPENDENT SPEAKER VERIFICATION," filed on May 31, 2012, the benefit of priority of which is claimed hereby, and which is incorporated by reference herein in its entirety.

FIELD OF THE INVENTION

The present invention generally relates to speaker verification, and more particularly relates to a system and method for text-dependent speaker verification.

BACKGROUND

Speaker verification or speaker authentication (also known as voice biometrics) is a binary classification task that consists of either accepting or rejecting an identity claim of a speaker by using some salient characteristics inherent in his/her voice. A speaker verification system can be limited by many factors. In particular, inter and intra-speaker variability as well as channel effects have been shown to strongly affect the accuracy of speech verification systems. In addition, duration constraints on both the enrollment and test speech material are usually required for ergonomic use in realistic applications. Unfortunately, state-of-the-art speaker recognition engines, which have proven their efficacy in unconstrained situations, reveal limitations when dealing with speech utterances shorter than ten seconds. Performance of automatic authentication engines also suffers from genuine imposture. For the case of voice biometric, this mainly consists of playing back a recording acquired from the client without his/her knowledge.

Thus, what is needed is a system and method for speaker verification that overcomes these drawbacks of prior embodiments. Furthermore, other desirable features and characteristics will become apparent from the subsequent detailed description and the appended claims, taken in conjunction with the accompanying drawings and this background of the disclosure.

SUMMARY

According to the Detailed Description, a speaker verification method is provided. The method includes receiving an utterance from a speaker and determining a text-independent speaker verification score and a text-dependent speaker verification score in response to the utterance. The method also includes determining a UBM-independent speaker-normalized score in response to a relationship between the text-dependent speaker verification score and the text-independent speaker verification score and determining speaker verification in response to the UBM-independent speaker-normalized score.

In accordance with another aspect, a Universal Background Model (UBM) independent speaker verification method is provided. The method includes receiving an utterance from a speaker and determining a text-independent speaker verification score and a text-dependent speaker verification score in response to the utterance. Finally, the method includes a UBM-independent speaker-normalized score in response to a relationship between the text-dependent speaker verification score and the text-independent speaker verification score and determining speaker verification in response to the UBM-independent speaker-normalized score.

In accordance with a further aspect, a dual-scoring text-dependent speaker verification method is provided. The method includes receiving a plurality of test utterances, determining a text-independent speaker verification score in response to each of the plurality of utterances, and determining a text-dependent speaker verification score in response to each of the plurality of utterances. The method also includes determining a UBM-independent speaker-normalized score in response to a relationship between the text-dependent speaker verification score and the text-independent speaker verification score and mapping the UBM-independent speaker-normalized score and the text-dependent speaker verification score for each of the plurality of utterances into a two-dimensional score space. The method further includes splitting the two-dimensional score space into three clusters, the three clusters corresponding to accept scores, indecisive scores and reject scores. Finally, the method includes defining a binary decision tree for speaker verification confidence score generation by identifying a logistic function at each node of the binary decision tree.

And in accordance with yet another aspect, a system for speaker verification is provided. The system includes an audio receiving device and a processor. The audio receiving device receives an utterance from a speaker and converts the utterance to an utterance signal. The processor is coupled to the audio receiving device for determining speaker verification in response to the utterance signal. The processor determines speaker verification in response to a UBM-independent speaker-normalized score by determining a text-independent speaker verification score and a text-dependent speaker verification score in response to the utterance signal, and determining the UBM-independent speaker-normalized score in response to a relationship between the text-dependent speaker verification score and the text-independent speaker verification score.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 2 depicts an exemplary dual scoring speaker verification system in accordance with the present embodiment utilizing the architecture of FIG. 1, wherein

FIG. 3, comprising FIGS. 3A, 3B, 3C and 3D, depicts graphs of distributions of the text-independent and text-dependent scores from the HiLAM speaker verification engine of FIG. 1 in accordance with the present embodiment, wherein FIG. 3A is a graph of a target speaker pronouncing a correct pass-phrase, FIG. 3B is a graph of the target speaker pronouncing a wrong pass-phrase, FIG. 3C is a graph of an impostor pronouncing the correct pass-phrase, and FIG. 3D is a graph of the impostor pronouncing a wrong pass-phrase.

FIG. 5, comprising FIGS. 5A and 5B, depicts graphs of scoring in accordance with the HiLAM speaker verification engine of FIG. 1, wherein FIG. 5A depicts a graph of UBM-normalized text-dependent scoring and FIG. 5B depicts a graph of speaker-normalized text-dependent scoring.

FIG. 6, comprising FIGS. 6A and 6B, depicts graphs of scoring in accordance with the HiLAM speaker verification engine of FIG. 1, wherein FIG. 6A depicts a graph of UBM-normalized text-dependent scoring and FIG. 6B depicts a graph of speaker-normalized text-dependent scoring.

FIG. 7, comprising FIGS. 7A, 7B and 7C, illustrates a dual-scoring soft decision margin system implemented using a decision tree wherein FIG. 7A depicts the decision tree in words, FIG. 7B visually depicts the decision tree, and FIG. 7C graphically depicts the decision tree.

Skilled artisans will appreciate that elements in the figures are illustrated for simplicity and clarity and have not necessarily been depicted to scale. For example, the dimensions of some of the elements in the block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of this invention to present a speaker verification system and method which presents significant improvement in two of the main degradation factors that affect commercial speaker verification engines—namely, duration constraint and imposture attacks.

Asking a speaker to pronounce a specific utterance is one of the constraints that could easily sustain the performance due to short speech duration. Numerous text-dependent speaker recognition approaches have been proposed to deal with short duration. Text-dependency could also help fighting against playback imposture by verifying the liveness of the speaker who has to pronounce a randomly prompted text.

A multi-layer acoustic architecture has been proposed, derived from the well known GMM/UBM (Gaussian Mixture Model/Universal Background Model) framework which allows performing both text-independent and text-dependent authentication at the same time. Thus, in accordance with the present embodiment, a new score computation that takes advantage of a three-layer architecture called Hierarchical multi-Layer Acoustic Model (HiLAM) and a novel speaker-specific score normalization is described herein. This speaker-specific score normalization provides higher verification accuracy than classical UBM normalized scoring. Additionally, we exploit the specificity of HiLAM architecture to propose a dual-scoring soft margin decision which allows a better discrimination between target, non-target and play-back trials.

Figure 1:
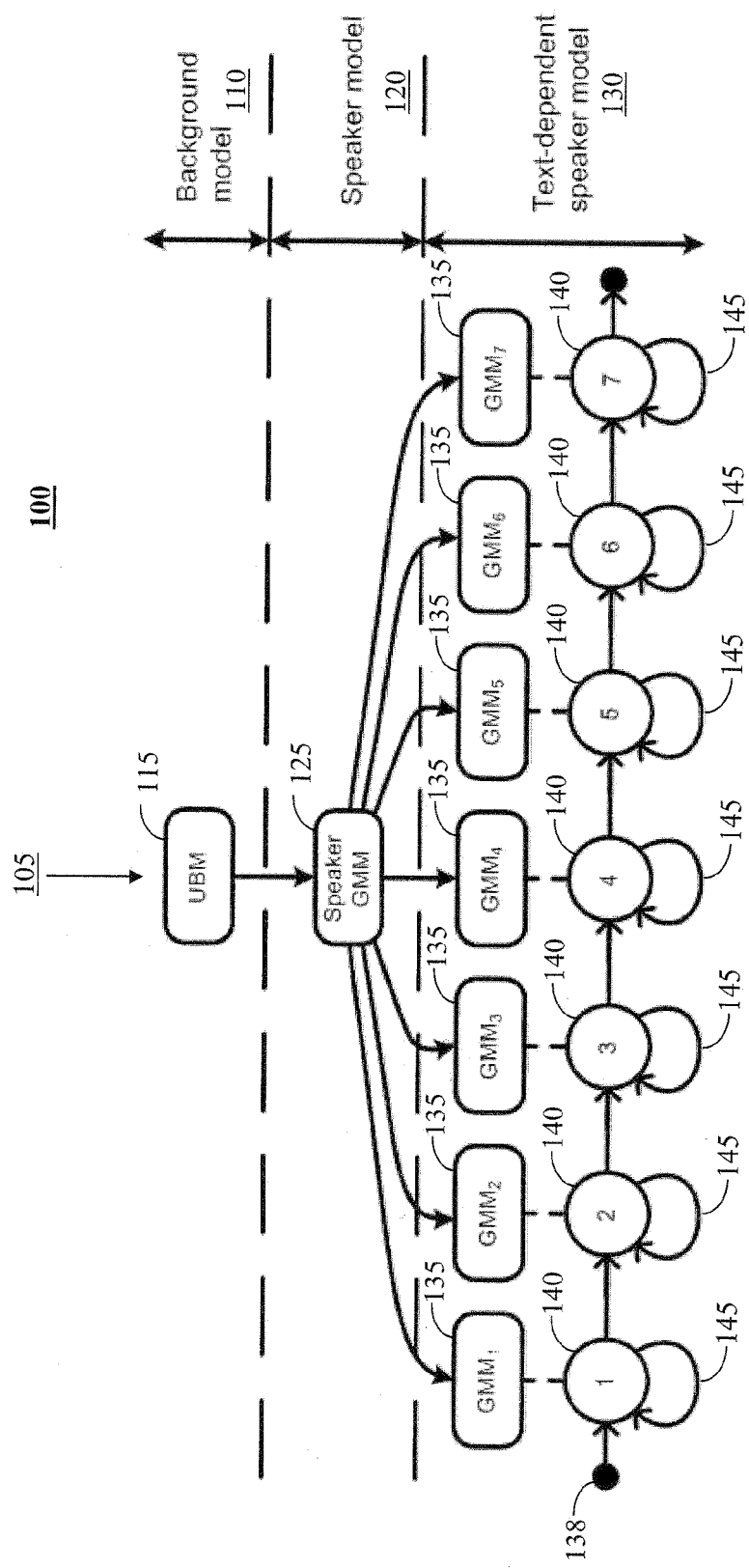
FIG. 1 depicts a diagram illustrating an overview of a Hierarchical multi-Layer Acoustic Model (HiLAM) architecture for a dual scoring speaker verification system in accordance with a present embodiment.

Referring to FIG. 1, a diagram 100 depicts a HiLAM architecture 105 in accordance with the present embodiment. All nodes 125, 135 in this architecture are Gaussian Mixture Models (GMM) sharing the same variance and weight parameters. The first two layers 110, 120 are similar to a conventional GMM/UBM architecture in which a UBM 115 at the upper layer models the general speech acoustic space. The middle layer 120 is the text-independent speaker model obtained by the classical Maximum a Posteriori (MAP) adaptation of the UBM. The bottom layer 130 hinges on the abilities of a left-right Hidden Markov Model (HMM) to harness specific temporal structures of pass-phrases. The emission probability density function of each HMM state 135 is derived from the middle-layer speaker-dependent GMM 125. Each of those GMMs 135 is adapted from the text-independent speaker model following the MAP criterion using an Expectation Maximization (EM) algorithm.

In accordance with the present embodiment, mean parameters are utilized as opposed to conventional architectures where weighted parameters are adapted. Thus, the present embodiment replaces the semi-continuous HMM (SCHMM) with a continuous density HMM (CDHMM) to provide higher accuracy at the expense of higher computation.

Further, all of the nodes 125, 135 in the HiLAM architecture 105 share the same variance and weight parameters taken from the UBM. In this manner, consistency of acoustic modeling between all three layers 110, 120, 130 serves as the basis for speaker-specific score normalization in accordance with the present embodiment.

In accordance with the present embodiment, the HiLAM architecture 105 is trained by first training the UBM 115 to model the acoustic space. Then, the text-independent speaker model 120 is adapted from the UBM 115 with all data pronounced by the client. Finally, an iterative training is performed to train the third layer HMM 130. In order to initialize the HMM for each pass-phrase, an utterance 138 is cut into S segments $\{seg_i\}$ 140, each segment 140 having the same length. Each state of the HMM 135 is adapted from the middle layer GMM 125 using the corresponding $seg_i$. A new segmentation is then performed using adapted HMM 135. In accordance with the present embodiment, a Viterbi algorithm 145 is used for the segmentation and this iterative process is performed until convergence of the Viterbi path. Further, in accordance with the present embodiment, the number of states S is chosen empirically and transitions of the left-right HMM are set to equiprobability.

During speech verification, the likelihood of a sequence the speech sequence $X=\{x_1, x_2, \ldots, x_t, \ldots, x_T\}$ is computed against each of the three layers 110, 120, 130 in the HiLAM architecture 105, as follows: $L_{UBM}(X)$ is the likelihood of X on the UBM 115, $L_{GMM}(X)$ is the likelihood of X on the speaker-dependent text-independent GMM 125, and $L_{HMM}(X)$ is the likelihood of X on the speaker-dependent text-dependent HMM aligned via Viterbi decoding 130.

Following a known GMM/UBM paradigm, a text-independent score, $S_{TI}(X)$, is calculated as $$S_{TI}(X) = \log\left(\frac{L_{GMM}(X)}{L_{UBM}(X)}\right) \quad (1)$$

where the numerator is the likelihood of the given sequence on the speaker's text-independent GMM 125 and the denominator is the likelihood of the given sequence over the UBM 115. The three layers 110, 120, 130 of the HiLAM architecture share the same mixture model structure (i.e. same weights and variances) that can be used to generate a text-dependent speaker verification score, $S_{TD}(X)$ by replacing the numerator in Equation 1 by the likelihood of the given sequence over the speaker's text-dependent HMM 130, as follows $$S_{TD}(X) = \log\left(\frac{L_{HMM}(X)}{L_{UBM}(X)}\right) \quad (2)$$

Figure 2A:
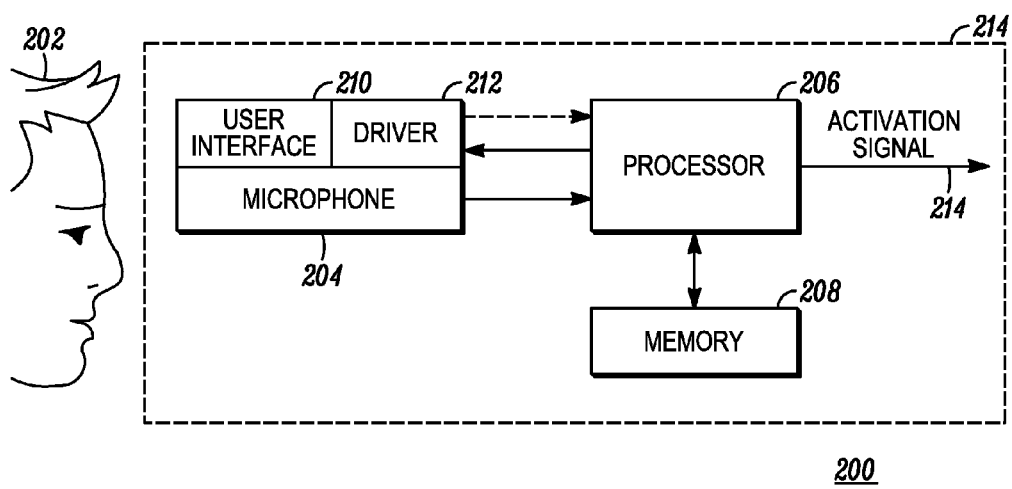
FIG. 2A depicts a diagram of the exemplary system and FIG. 2B depicts a flowchart of operation of a processor within the system which performs the dual scoring speaker verification in accordance with the present embodiment.

The corresponding score is a UBM-normalized text-dependent score. Using the text-dependent likelihood ratio from $S_{TD}(X)$ advantageously outperforms conventional GMM/UBM architectures for text-dependent speaker verification as described hereinbelow. Thus, in accordance with the present embodiment, combining both text-dependent and text-independent speaker scores give rise to speaker-specific score normalization which greatly improves the performance of the text-dependent speaker verification engine Referring to FIG. 2A, a diagram 200 of a system utilizing the dual-scoring text-dependent speaker verification engine architecture in accordance with the present embodiment combining both text-dependent and text-independent speaker scores is depicted. The system could be part of a controlled access system, such as controlling the opening or closing of a door or container in response to speaker verification in accordance with the present embodiment.

A speaker 202 speaks an utterance into a microphone 204. The microphone converts the utterance into electrical signals which are supplied as in input to a processor 206. The processor 206 performs speaker verification in accordance with the present embodiment, utilizing data stored in a memory 208 such as data from speaker verification scoring trials by the same speaker and/or different speakers as described hereinbelow.

A decision by speaker verification in accordance with the present embodiment would result in either an accept decision, a reject decision, or an indecisive decision. If a reject decision is found, the processor 206 sends a signal to a display of a user interface 210 via a driver 212 to display a message to the speaker indicating that the utterance was rejected (i.e., a negative verification). If an indecisive decision is found, the processor 206 sends a signal to the display of the user interface 210 via the driver 212 to display a message to the speaker indicating that the speaker should provide another utterance. And, if an accept decision is found, the processor 206 sends an authentication signal 214 for additional action in response to verification of the speaker (e.g., opening a door or a container). While individual elements are shown in the diagram 200, all of these could be encompassed in a single device 216, such as a computer or mobile phone where the authentication signal 214 would permit access to a particular file or folder or other data stored on the device 216 or in another device coupled to the device 216 or at a location online with the device 216.

Figure 2B:
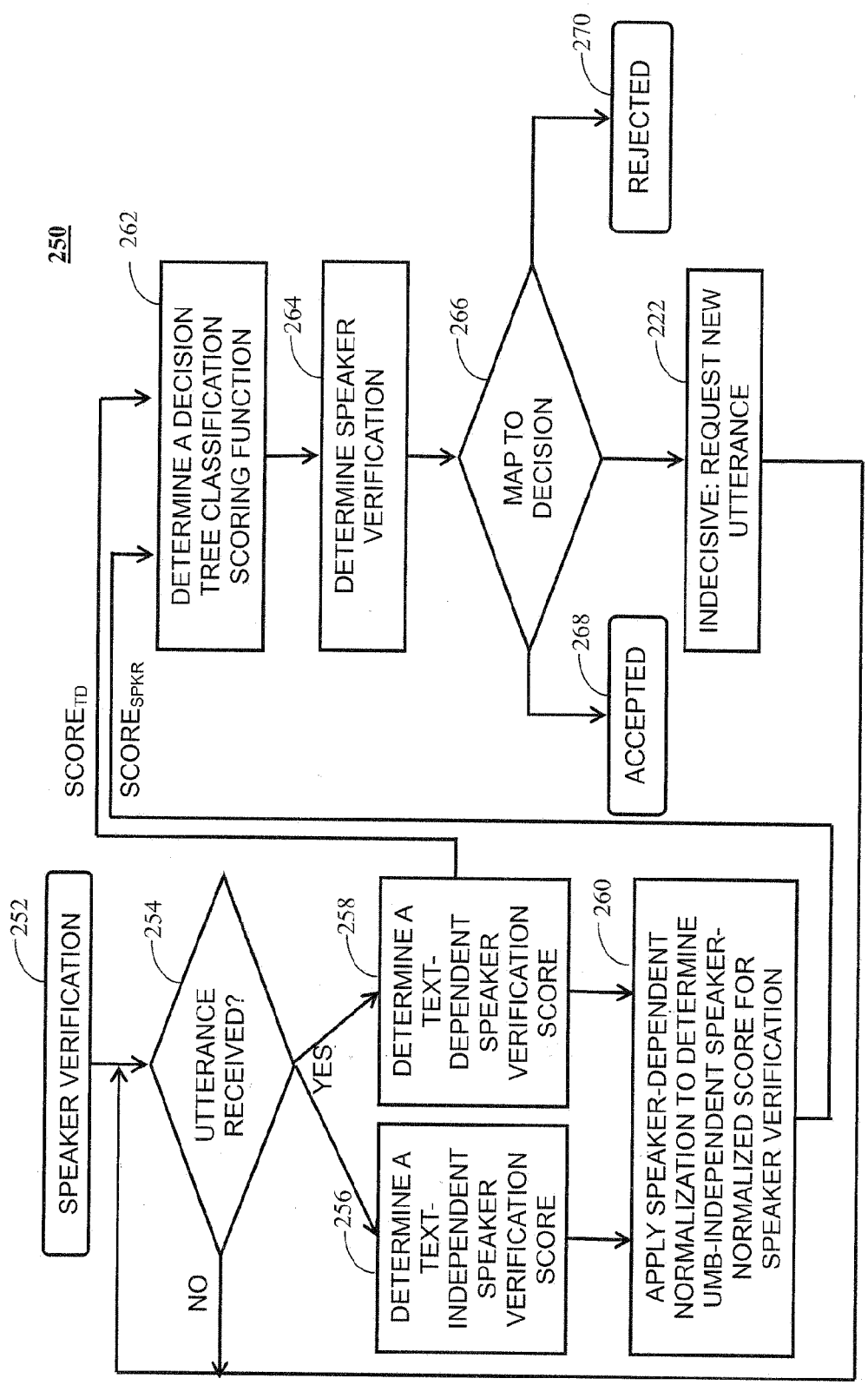

Referring to FIG. 2B, a flowchart 250 depicts operation of the dual-scoring text-dependent speaker verification engine architecture 252 in the processor 206 in accordance with the present embodiment combining both text-dependent and text-independent speaker scores.

When an utterance is received 254 from the speaker 202, a text-independent speaker verification score is determined 256 in response to a speaker-dependent text-independent Gaussian Mixture Model (GMM) of the utterance.

Simultaneously, a text-dependent speaker verification score is determined 258 in response to a Hidden Markov Model (HMM) of the utterance aligned by a Viterbi decoding. Then, a speaker-specific score normalization is applied 260 to the relationship between the text-dependent speaker verification score and the text-independent speaker verification score to determine a UMB-independent speaker-normalized score for speaker verification. A decision tree classification scoring function comprising a single dimensional confidence interval with three decision regions (an accept decision region, an indecisive decision region and a reject decision region) has been determined 262 in response to a speaker-specific score threshold and a UBM score threshold as applied to a plurality of speaker-normalized scores generated in a speaker scoring trial. The decision tree classification scoring function is then utilized to determine speaker verification 264 in response to a dual-scoring soft decision margin combination of the speaker-specific score normalization of the relationship between the text-dependent speaker verification score and the text-independent speaker verification score and a normalized UBM scoring by mapping 266 the speaker-specific score normalization and the normalized UBM scoring to the three decision regions.

If the mapping 266 of the speaker verification score places it in the accept decision region, an accept response 268 is provided via the authentication signal 214. If the mapping 266 of the speaker verification score places it in the reject decision region, a reject response 270 is provided via the user interface 210. If, on the other hand, the mapping 266 of the speaker verification score places it in the indecisive decision region, a further speaker utterance is requested 272 via the user interface 210 and processing returns to await another speaker utterance.

Those skilled in the art will realize that many variants of this process are possible. For example, a threshold of indecisive responses could be set (e.g., three) after which a subsequent indecisive determination would be classified as a reject 270.

Text-dependent speaker verification engines have to deal with four types of trials depending on whether the speaker is the client or an impostor and whether the speaker pronounces a correct pass-phrase or a wrong pass-phrase. These four types of trials are summarized in Table 1 below. The task of the verification engine is to accept target trials and reject non-target trials. However, the distinction between target and non-target could vary according to the nature of the application. A text-independent system considers both CLIENT-pwd and CLIENT-wrong trials as target trials, whereas a text-dependent system considers CLIENT-wrong trials as non-target. Indeed, a CLIENT-wrong trial has to be considered as a playback imposture and then must be rejected by the system.

TABLE 1

|  | Correct Pass-Phrase | Wrong Pass-Phrase |
|---|---|---|
| Client | CLIENT-pwd | CLIENT-wrong |
| Impostor | IMP-pwd | IMP-wrong |

FIG. 3, comprising FIGS. 3A, 3B, 3C and 3D, depicts graphs 300, 320, 340, 360 of distributions of scores $S_{TD}(X)$ and $S_{TI}(X)$ drawn from the HiLAM architecture 105 for the four types of trials depicted in Table 1. FIG. 3 highlights a shift between the text-dependent and text-independent scores for CLIENT-pwd trials while such a shifting is not observed in the case of trials considered as impostor (i.e. CLIENT-wrong, IMP-pwd and IMP-wrong). The bottom layer HMM of the HiLAM models the lexical information of the spoken pass-phrase in addition to the speaker-specific information of the text-independent middle layer from which the HMM was derived. This lexical information helps discriminate between speakers by increasing the score of the CLIENT-pwd trials as shown on the graph 300 which depicts a target speaker pronouncing a correct pass-phrase and where the text-independent distribution is plotted on trace 302 and the text-dependent distribution is plotted on trace 304.

Figure 3B:
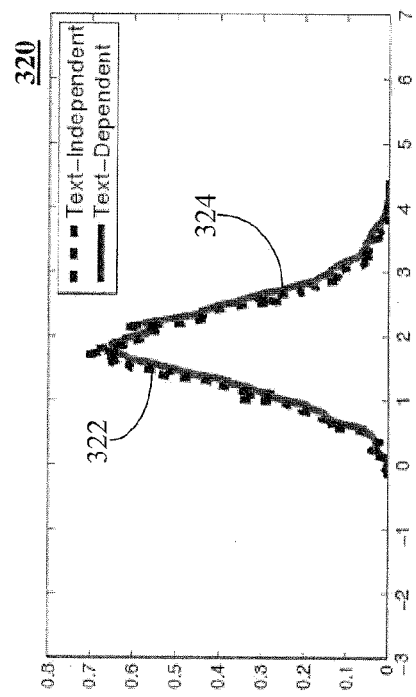
Figure 3A:
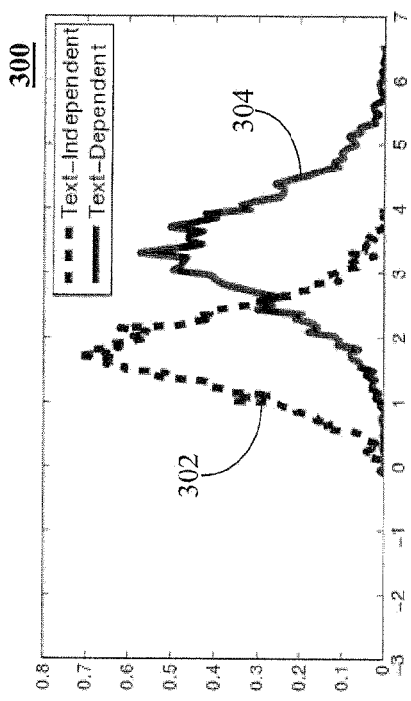
Figure 3D:
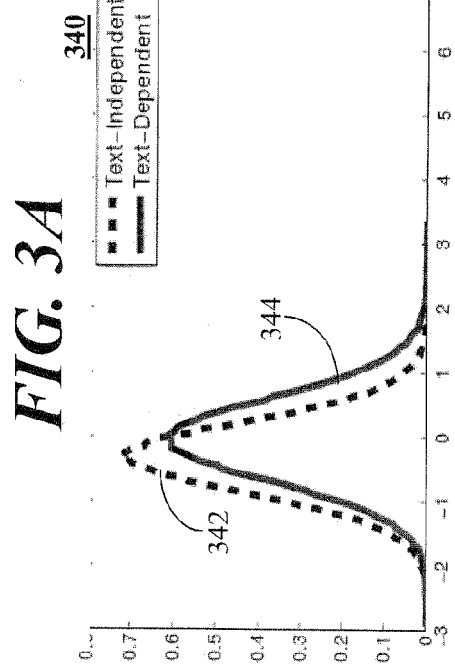
Figure 3C:
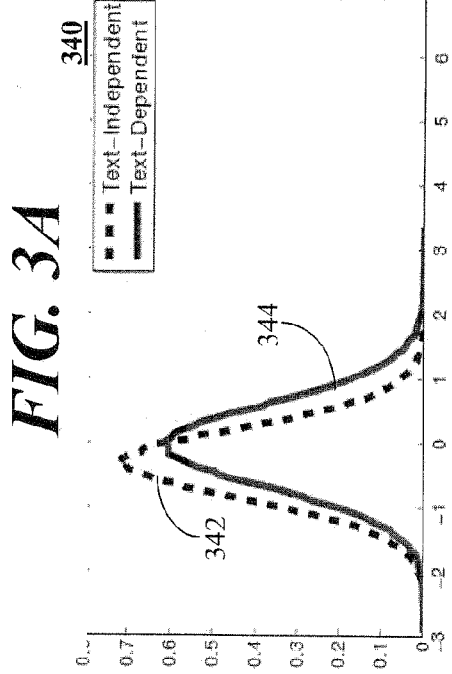

Referring to FIG. 3C, the graph 340 plots an impostor pronouncing the correct pass-phrase with the text-independent distribution plotted on trace 342 and the text-dependent distribution is plotted on trace 344. The graph 340 shows that modeling of the temporal structure of the spoken utterance also increases the scores of trials for impostor pronouncing the correct utterance (IMP-pwd). However, this increase is strongly limited as the HMM specifically models the client pronouncing the given pass-phrase.

Referring to FIGS. 3B and 3D (graphs 320, 360), when speakers pronounce a pass-phrase different from the one used to train the third layer HMM, distributions of the text-independent and text-dependent scores are similar (i.e., trace 322 (the text-independent distribution) and trace 324 (the text-dependent distribution) overlap; likewise, trace 362 (the text-independent distribution) overlaps trace 364 (the text-dependent distribution). Thus, it can be seen that the constraint imposed by the HMM structure during the Viterbi decoding results in a sub-optimal alignment which causes the HMM scoring to be equivalent to the GMM one.

Figure 4:
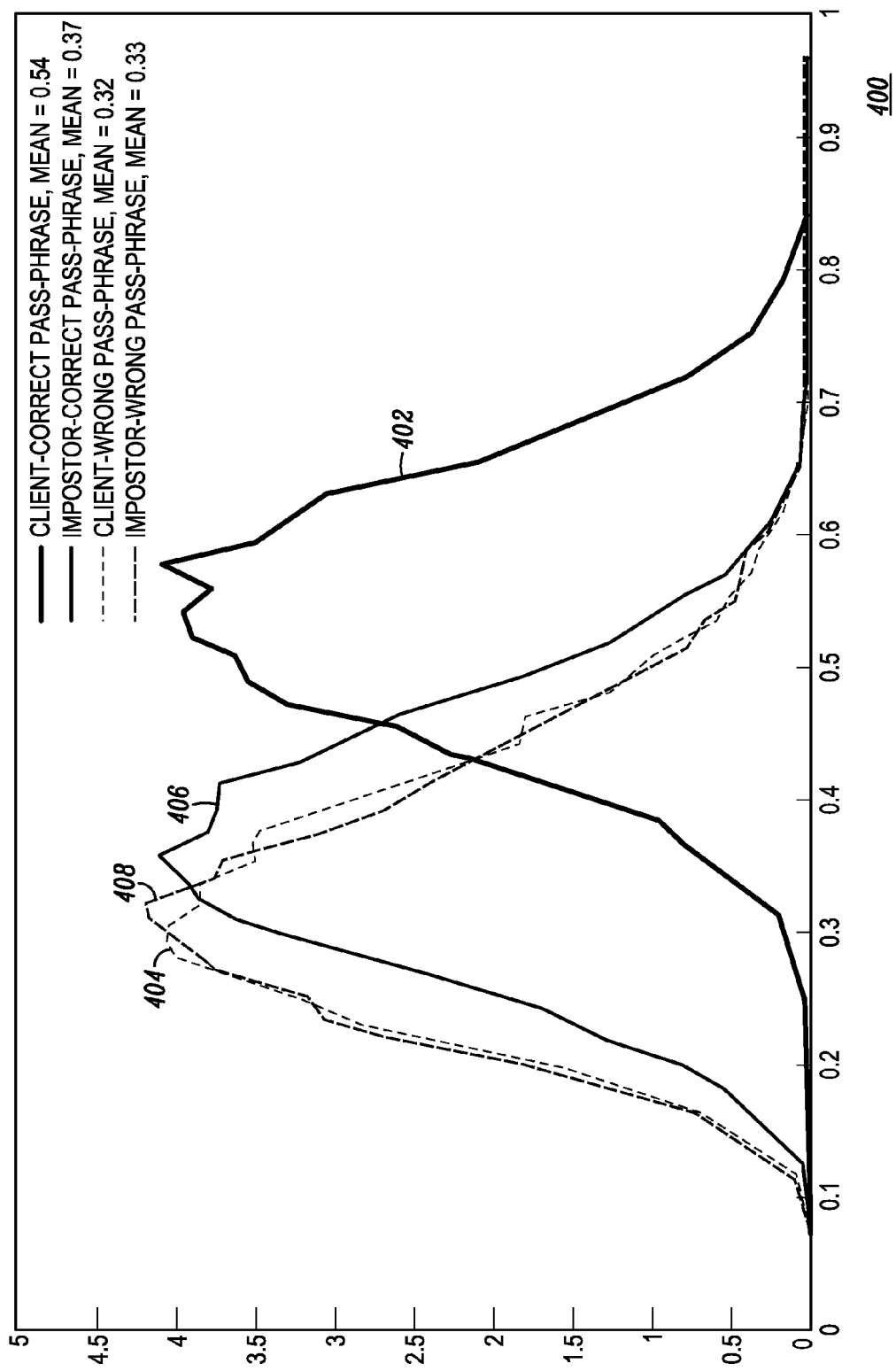
FIG. 4 depicts a graph of distributions of frames allocated to the same state in terms of percentage for two Viterbi alignments performed by the HiLAM speaker verification engine of FIG. 1 with and without left-right constraints on the same acoustic model for different types of trials.

This phenomenon is highlighted in FIG. 4. FIG. 4 depicts a graph 400 of distributions of frames allocated to the same state in terms of percentage for two Viterbi alignments performed by the HiLAM speaker verification architecture 105 with and without left-right constraints on the same acoustic model for different types of trials. For each trial, the path computed with Viterbi decoding using the text-dependent speaker HMM is compared to the path computed using the same HMM without the left-right constraint. In this second alignment, each frame is allocated to the state of the HMM on which the likelihood is the highest without considering any temporal constraint. FIG. 4 shows the distributions of frames allocated to the same state for both paths in terms of percentage, where the CLIENT-pwd trial results are plotted on trace 402, the CLIENT-wrong trial results are plotted on trace 404, the IMPOSTOR-pwd trial results are plotted on trace 406, and the IMPOSTOR-wrong trial results are plotted on trace 408. Note that the higher this percentage is, the better the temporal structure of the test segment fit the structure of the HMM (i.e. the structure of the training pass-phrase). From the graph 400, it can be seen that when speakers pronounce a wrong pass-phrase, the average percentage of frame allocated to the most likely state during the Viterbi decoding is less than thirty-five percent regardless of the identity of the speaker. For an impostor pronouncing the correct pass-phrase, the percentage is slightly higher (thirty-seven percent) when it reaches fifty-four percent for a CLIENT-pwd trial.

Therefore, in accordance with the present embodiment, the score normalization method shown in FIG. 2B takes advantage of the differences between text-independent and text-dependent scores as shown in FIGS. 3 and 4. Considering that the CLIENT-pwd is the only category of trials for which the verification score is strongly affected by the lexical content we introduce a new score normalization based on the difference of text-independent and text-dependent score. This score is given by $$S_{SPK}(X) = S_{TD}(X) - S_{TI}(X) \tag{3}$$

This expression is simplified by using Equation 1 and Equation 2 to obtain:

$$S_{SPK}(X) = \log\left(\frac{L_{HMM}(X)}{L_{GMM}(X)}\right) \tag{4}$$

Note that this expression is independent of the UBM which is now only used to structure the acoustic space. This new score is referred to as the speaker-normalized text-dependent score. For more clarity, the text-dependent score defined according to Equation 2 will now be referred as UBM-normalized text-dependent score. This new score normalization improves discrimination between clients and impostors and also discriminates between true client accesses and playback impostures. The scores $S_{TD}(X)$ and $S_{SPK}(X)$ correspond to UBM- and Speaker-normalized text-dependent scores, respectively.

Verification of the method in accordance with the present embodiment as depicted in FIG. 2B was performed using a database of audio records from twenty-eight male speakers. Based on a phonetically balanced set of thirty pass phrases, nine sessions for each pass phrase were recorded for each speaker. The nine sessions were recorded on three different devices (d1, d2 and d3) including cell-phones and tablets following the sequence was {d1, d2, d3, d1, d2, d3, d1, d2, d3}. In addition, the UBM trained with recordings of one hundred eighteen male speakers independent of the database of audio records used for testing. One HMM was trained for each pass phrase using the utterances of the same pass-phrase from the first three sessions. Due to the small number of speakers available, a jackknifing process was used for which each of the twenty-eight speakers in the database of audio records is successively considered as a client and the remaining twenty-seven speakers are impostors. The number of tests performed for each trial condition is given in Table 2:

TABLE 2

| Trial type | | Number of tests |
| --- | --- | --- |
| target | correct pass-phrase | 5,012 |
| target | wrong pass-phrase | 145,349 |
| impostor | correct pass-phrase | 135,327 |
| impostor | wrong pass-phrase | 3,924,424 |

Mel Frequency Cepstral Coefficients (MFCC) were used, and were computed every ten milliseconds. An energy labeling was then applied to separate the speech frames from the non-speech frames. In accordance with an aspect of the present embodiment, acoustic feature frames are 50-dimension vectors, 17 cepstral coefficients, the log-energy, the corresponding Δ coefficients and the first 14 ΔΔ coefficients. For speaker modeling, the number of components in GMMs was fixed to one hundred twenty-eight and the number of states in the pass-phrase dependent HMM was set to five.

Experiments were conducted to assess the discriminative power of the speaker-normalized text-dependent scoring in accordance with the present embodiment. The text-independent GMM/UBM method was taken as the baseline and the experimental results presented in Table 3 show the performance of the HiLAM system 105 using the UBM-normalized scoring and the new speaker-normalized scoring in accordance with the present embodiment and the methodology of FIG. 2.

TABLE 3

| | Speaker | | | | Text | Text-Dependent (% EER) | |
|---|---|---|---|---|---|---|---|
| | Client | | Impostor | | Independent | UBM- | Spk- |
| | Text | | | | | | |
| | Correct | Wrong | Correct | Wrong | GMM/UBM | norm | norm |
| Trials | target | — | non | — | 3.95 | 1.38 | 1.90 |
| | target | target | non | non | 3.94 | 4.00 | 33.54 |
| | target | — | non | non | 3.94 | 0.71 | 0.47 |
| | target | non | non | — | 34.16 | 11.8 | 1.32 |

The bottom four rows in Table 3 show the performance of the HiLAM depending on the definition of target and non-target trial in terms of Equal Error Rate (EER). In the first row, only those trials for which the speakers (both client and imposters) pronounce the correct pass-phrase are considered for both target and non-target trials. In this configuration, EER decreases from 3.95% to 1.38% when using the UBM-normalized text-dependent scoring and then to 1.90% with the new speaker-normalized text-dependent scoring.

The second row of Table 3 is given as a reference since the speaker-normalized text-dependent scoring is not designed for this configuration where CLIENT-wrong trials are regarded as target trials (this configuration corresponds to a text-independent protocol).

The third row of Table 3 shows the results in the optimum configuration when the clients pronounce the correct pass-phrase and the impostor speakers pronounce either the correct or a wrong pass-phrase. In this condition, scoring in accordance with the present embodiment improves the performance of the speech verification engine. Indeed, the EER drops by 81% with respect to the GMM/UBM baseline and by 33% (from 0.71% to 0.47%) compared to the original text-dependent system Finally, the last row of Table 3 shows the performance of the three systems when dealing with the most realistic condition: the client speakers only pronounce the correct pass-phrase, the impostor speakers pronounce the correct pass-phrase and the system is set against playback imposture (recordings of client speakers pronouncing a wrong pass-phrase). In this configuration, the text-independent GMM/UBM system which is not designed to discriminate between CLIENT-pwd and CLIENT-wrong obtains more than 34% of EER. When using the speaker-normalized text-dependent score in accordance with the present embodiment which is designed to discriminate between genuine client accesses and playback impostures, the EER drops by 88% (from 11.88% to 1.32%) relative to the original UBM-normalized text-dependent scoring.

Figure 5A:
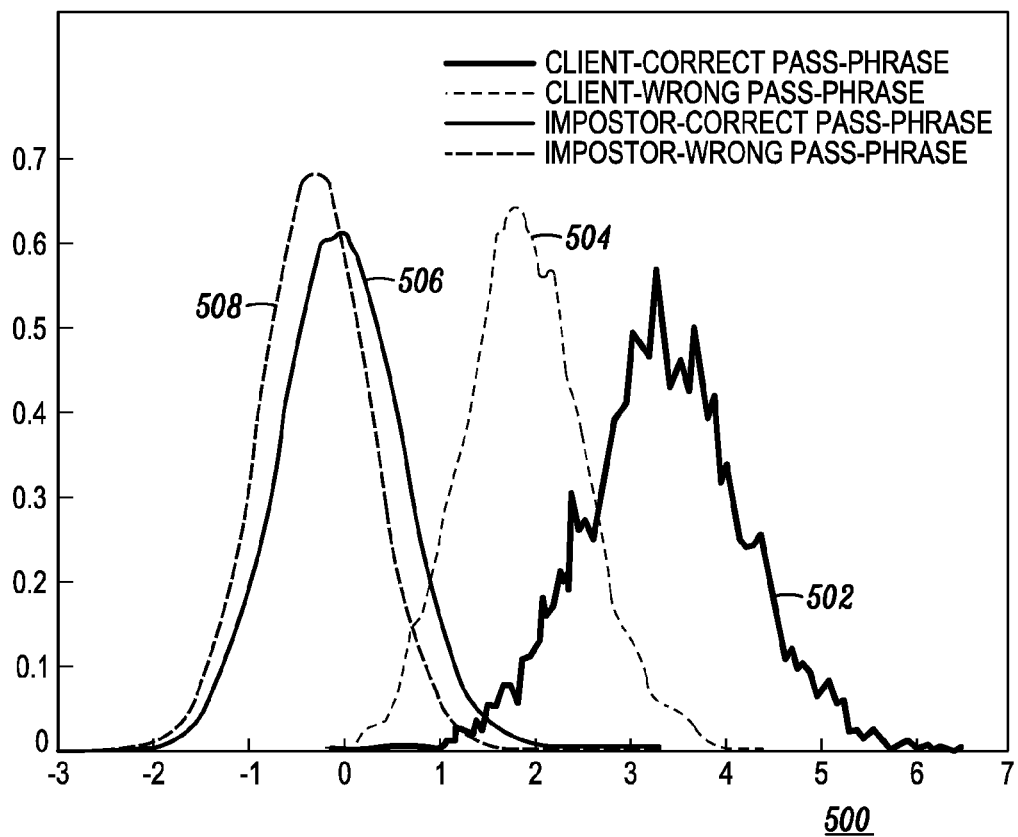
Figure 5B:
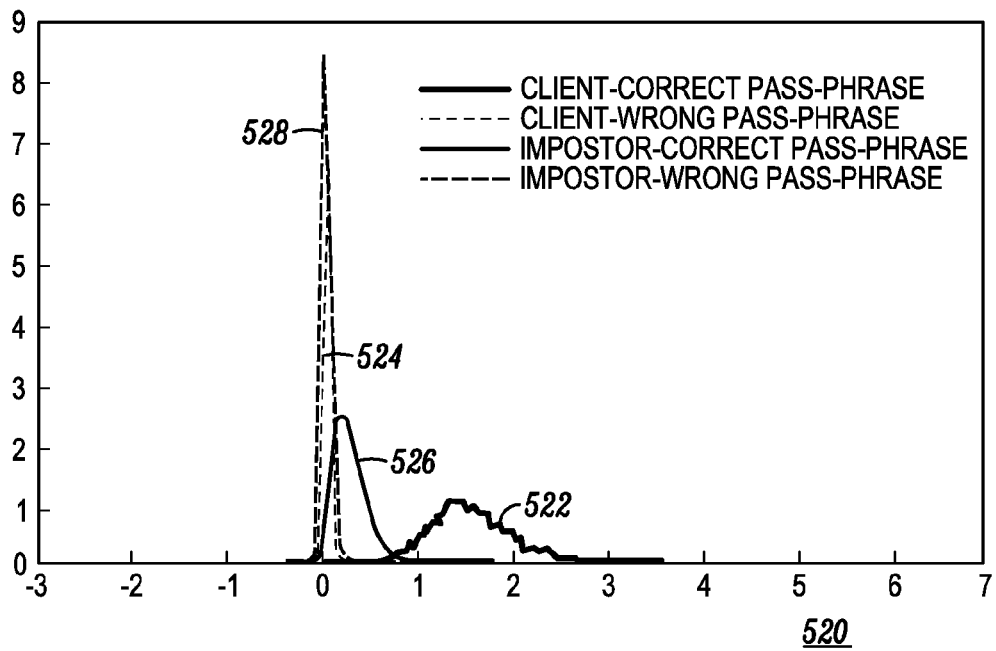

FIG. 5, including FIGS. 5A and 5B, show the distribution of text-dependent scores for four types of trials respectively normalized with UBM and text-independent speaker GMM. Referring to FIG. 5A, a graph 500 of the UBM-normalized text-dependent scoring shows a trace 502 corresponding to the CLIENT-pwd, a trace 504 corresponding to the CLIENT-wrong, a trace 506 corresponding to the IMP-pwd, and a trace 508 corresponding to the IMP-wrong. Similarly, referring to FIG. 5B, a graph 520 of the speaker-normalized text-dependent scoring shows a trace 522 corresponding to the CLIENT-pwd, a trace 524 corresponding to the CLIENT-wrong, a trace 526 corresponding to the IMP-pwd, and a trace 528 corresponding to the IMP-wrong. From the graph 500 it can be seen that the score distribution of CLIENT-wrong trials (the trace 504) overlaps significantly with both the CLIENT-pwd and IMP score distributions (the traces 502, 506, 508). When using the new speaker-normalized scoring as shown in the graph 520, we observe that the distribution of CLIENT-pwd (the trace 522) is isolated from the other three distributions (the traces 524, 526, 528).

Figure 6A:
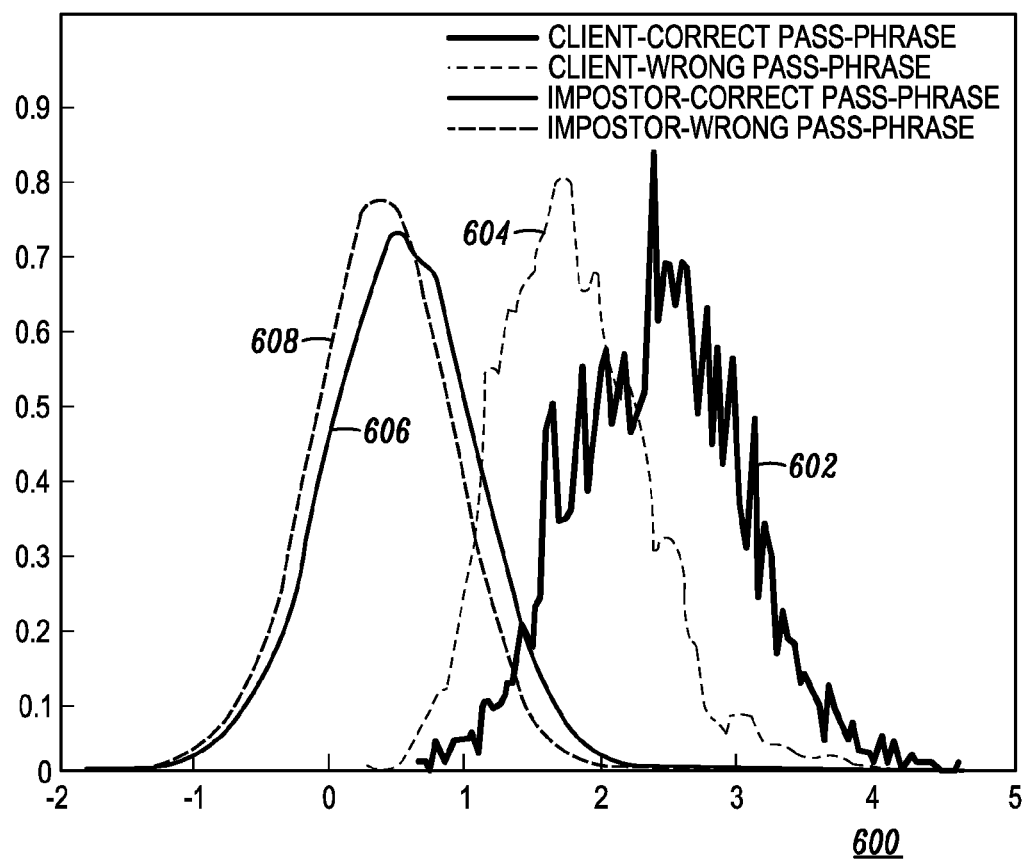
Figure 6B:
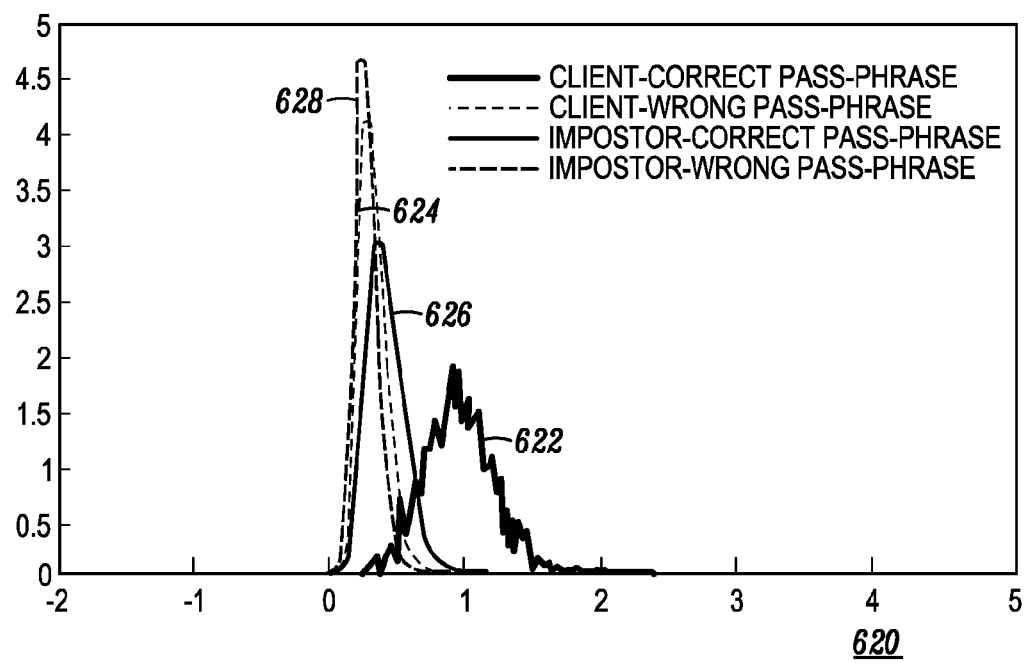

A similar experiment was performed on a second database to confirm the results. This experiment followed a conventional protocol, and FIG. 6, including FIGS. 6A and 6B, shows that the system behaves the same manner on this second database. Referring to FIG. 6A, a graph 600 of the UBM-normalized text-dependent scoring shows a trace 602 corresponding to the CLIENT-pwd, a trace 604 corresponding to the CLIENT-wrong, a trace 606 corresponding to the IMP-pwd, and a trace 608 corresponding to the IMP-wrong. Similarly, referring to FIG. 6B, a graph 620 of the speaker-normalized text-dependent scoring shows a trace 622 corresponding to the CLIENT-pwd, a trace 624 corresponding to the CLIENT-wrong, a trace 626 corresponding to the IMP-pwd, and a trace 628 corresponding to the IMP-wrong.

TABLE 4

| | Speaker | | | | | Text-Dependent (% EER) | |
|---|---|---|---|---|---|---|---|
| | Client | | Impostor | | Text | UBM- | Spk- |
| | Text | | | | | | |
| | Correct | Wrong | Correct | Wrong | Independent | norm | norm |
| Trials | target | — | non | — | 6.24 | 3.77 | 4.73 |
| | target | target | non | non | 6.24 | 6.22 | 28.86 |
| | target | — | non | non | 6.24 | 2.92 | 1.63 |
| | target | non | non | — | 23.74 | 15.19 | 4.00 |

Performance of the HiLAM system on a further database as shown in Table 4 can be favorably compared to previous results reported on a conventional protocol as shown in FIGS. 5 and 6.

The graphs 500 and 600 show the distributions of the UBM-normalized text-dependent score, computed using Equation 2, for four types of trials encountered in text-dependent speaker verification. The imposter trials with correct and wrong pass-phrases (i.e., IMP-pwd and IMP-wrong), respectively, exhibit highly overlapping distributions as can be seen on the left-side of the graphs 500 and 600.

The distribution of the CLIENT-pwd trials (on the right-side of the graphs 500, 600) is highly separated from the IMP trials. However, the distribution of the CLIENT-wrong or playback trials (appearing at the center of the graphs 500, 600) overlap significantly with the other distributions. Setting the decision threshold therefore becomes very difficult.

A simple approach would be to use two thresholds, one at the right end of the non-target score minimizing the false acceptance rate ($P_{FA}$), the other at the left-end of the target score distribution minimizing the false rejection error ($P_{FR}$). Any scores that fall between the two thresholds (including those of the playback trials) are deemed to be indecisive and the system should prompt the speaker again with a different pass phrase. The score range between the two thresholds can thus be seen as a soft-decision margin.

Adopting a similar soft-decision margin on top of the HiLAM model, improves the discrimination between the three categories of scores (CLIENT-pwd, impostor and playback). Recall that the HiLAM model generates three different scores by using the different layers of the three layer architecture 105 (FIG. 1)

Table 5 shows the results using the three different scores considering two definitions of target and non-target trials. The second last row of the Table 5 shows the performance when considering only CLIENT-pwd as target trial. This condition corresponds to the case of cooperative speakers, in which the CLIENT-wrong trials can be considered as playback impostures. Under this scenario, speaker-normalized text-dependent scoring provides the best discrimination with an Equal Error Rate (EER) of 0.68% while text-independent and UBM-normalized text-dependent scoring obtain 6.20% and 2.70% of EER, respectively.

and speaker-normalized text-dependent scores in Equation 2 and Equation 4, respectively, can be obtained. A first threshold $\theta_1$ is set with the speaker-normalized score minimizing the False Acceptance ($P_{FA}$). A second threshold $\theta_2$ is then set with the UBM-normalized score minimizing the False Rejection ($P_{FR}$).

Figures 7A, 7B, 7C:
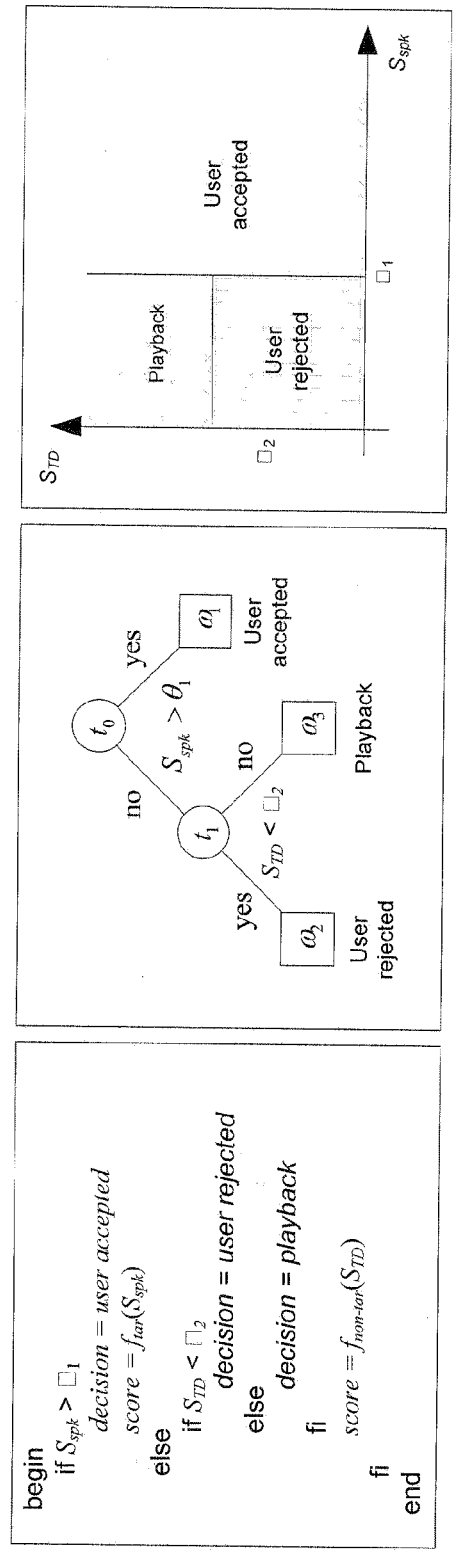

Since the two thresholds are set on two different scores, the decision as to which category a given trial belongs to is done using a decision tree, as depicted in FIGS. 7A and 7B. FIG. 7, including FIGS. 7A, 7B and 7C, illustrates a dual-scoring soft decision margin system implemented using a decision tree, wherein FIG. 7A depicts the decision tree in words, FIG. 7B visually depicts the decision tree, and FIG. 7C graphically depicts the decision tree.

Referring to FIGS. 7A and 7B, a sequence of decisions is applied to individual scores along a path of nodes. At the first node, the speaker is accepted as the true client if the $S_{SPK}$ score is higher than the first threshold $\theta_1$. If this score is lower than $\theta_1$ then the $S_{SPK}$ score is compared to the second threshold $\theta_2$. If $S_{TD}<\theta_2$ the trial is classified as an imposture; otherwise the trial is classified as a playback in which case the speaker could be asked to try again with a different pass phrase. Note that the dual-scoring scheme improves classification performance only if $S_{SPK}$ is good for discriminating between CLIENT-pwd and all three other types of trial and $S_{TD}$ is good for discriminating between CLIENT-wrong and IMP accesses. FIG. 7C shows the partitions or clusters produced by the decision tree in a two-dimensional score space.

The remaining task is to map the dual scores to a one dimensional confidence measure, while retaining the classes (i.e., accept, indecisive, and reject) information. Since each node is associated with a binary classification problem, the logistic function at each node of the decision tree may be used for the mapping. In particular, the generalized form of logistic function of Equation 5 may be used.

TABLE 5

|  | Speaker | | | | Text-Dependent (% EER) | |
| --- | --- | --- | --- | --- | --- | --- |
| | Client | | Impostor | | | |
| | Text | | | Text | UBM- | Spk- |
| | Correct | Wrong | Correct | Wrong | Independent | norm | norm |
| Trials | target | non | non | non | 6.20 | 2.70 | 0.68 |
| | — | target | non | non | 4.32 | 4.52 | 34.58 |

The last row of the table shows the results when CLIENT-wrong trials are considered as target. It can be observed that a better accuracy is obtained by using the text-independent (4.32% of EER) or UBM-normalized text-dependent scoring (4.52% of EER). The speaker-normalized text-dependent scoring gives a significantly high EER of 34.58% because, as seen in the graphs 500 and 600, the distribution of the CLIENT-wrong trial overlaps significantly with the other trials when the speaker-normalized text-dependent scoring is used. Combining the discrimination power given by both the speaker-normalized and UBM-normalized text-dependent scores, a dual-scoring soft decision margin system, as detailed below, can be generated. Compared to the text-independent score, this system uses the UBM-normalized text-dependent score considering its text-dependency to give a more stable and robust performance.

Using the UBM, GMM, and HMM scores from the top, middle, and bottom layers of the architecture 105, the UBM- $$m = f(S) = \left[\log\left(\frac{logit^{-1}(\alpha)[\exp(aS+b)-1]+1}{logit^{-1}(\beta)[\exp(aS+b)-1]+1}\right) + M_0\right] \times A \quad (5)$$

Figure 8:
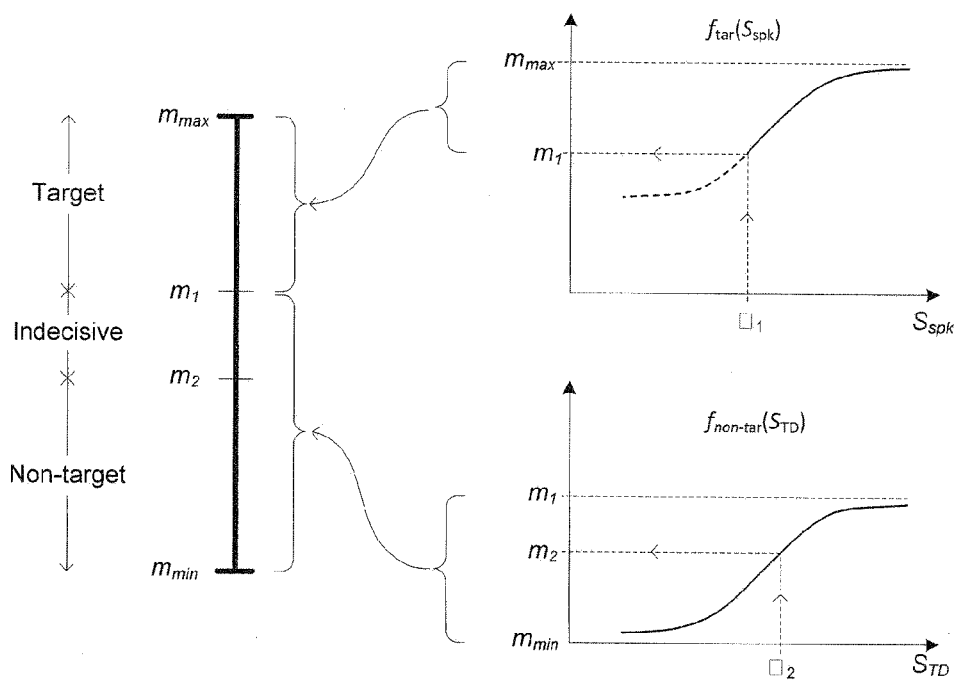
FIG. 8 illustrates mapping of dual scores to a single confidence score via logistic functions.

There are different generalized forms of logistic function. However, the logistic function of Equation 5 is flexible in setting the lower and upper asymptotes ($-\alpha$ and $-\beta$) and the cross-over point ($-b/a$). Two additional parameters $M_0$ and A are used to control the shifting and scale of the logistic function. Referring to FIG. 8, a mapping of dual scores is illustrated by placing two logistic functions, $f_{TAR}(S_{SPK})$ and $f_{NON-TAR}(S_{TD})$ respectively, at node $t_0$ and $t_1$ of the decision tree. Both mapping functions have the same form as in Equation 5 with different parameters. The dual scores are mapped to a single confidence measure m, having three decision regions {accept, indecisive, reject} corresponding to the three clusters in the two-dimensional score spaces as shown in FIG. 7C.

In order to determine the thresholds, a set of ten speakers, independent from the speakers previously used, record the same thirty sentences within six sessions in conditions similar to the previous conditions. Given the results obtained on this development set and the targeted False Acceptance ($P_{FA}$) and False Rejection ($P_{FR}$) rates, the thresholds are fixed and then used for the decision tree.

In the following experimental results, a False Acceptance refers to a non-target trial being accepted while False Rejection refers to a target trial being rejected. Note that indecisive trials are not regarded as miss-classified: indeed an indecisive non-target trial failing is not accepted and an indecisive target trial is regarded as a minor drawback to the client compared to its complete rejection.

Target trials are defined as CLIENT-pwd condition and non-target trials only include CLIENT-wrong and IMP-pwd conditions. The IMP-wrong condition is not considered here as the large number of trials and the easiness of the classification would create artificially low miss classification rates. In addition, thresholds are fixed according to the development set in order to target the following false acceptance and false rejection rates:

$$\begin{cases} \text{False Acceptance} = 0.5\% \\ \text{False Rejection} = 1\% \end{cases} \quad (6)$$

Percentages of trials classified in each of the three categories are given in Table 6 for comparison when using the only UBM-normalized text-dependent score for decision.

TABLE 6

|  | Rejected | Indecisive | Accepted |
| --- | --- | --- | --- |
| Client - correct pass-phrase | 0.14 | 2.45 | 97.41 |
| Client - wrong pass-phrase | 6.28 | 31.97 | 61.75 |
| Impostor - correct pass-phrase | 92.24 | 7.12 | 0.64 |
| Impostor - wrong pass-phrase | 97.56 | 2.36 | 0.08 |

In this condition, the miss-classification rates are:

$$\begin{cases} \text{False Acceptance} = 32.29\% \\ \text{False Rejection} = 0.14\% \end{cases} \quad (7)$$

Then, the acceptance threshold is fixed according to the speaker-normalized text-dependent score and the rejection threshold according to the text-independent score. Miss-classification rates obtained are:

$$\begin{cases} \text{False Acceptance} = 1.24\% \\ \text{False Rejection} = 0.55\% \end{cases} \quad (8)$$

Table 7 shows the percentage of the different types of trial classifications after soft-margin decisions using speaker-normalized text-dependent scores and text-independent scores. As seen from Table 7, the large majority of target trials (97.77%) are accepted and 87.39% of the IMP-pwd trials are fully rejected. The interest of the soft margin is verified as 98.68% of the playback attacks (i.e. TAR-wrong trials) are labeled as indecisive

TABLE 7

|  | Rejected | Indecisive | Accepted |
| --- | --- | --- | --- |
| Client - correct pass-phrase | 0.02 | 1.42 | 98.56 |
| Client - wrong pass-phrase | 0.23 | 99.76 | 0.017 |
| Impostor - correct pass-phrase | 64.73 | 32.70 | 2.56 |
| Impostor - wrong pass-phrase | 80.18 | 19.82 | 0.0002 |

Next, the acceptance threshold is set according to the speaker-normalized text-dependent score and the rejection threshold according to the UBM-normalized text-dependent score. Results are reported in Table 8. In this configuration, the miss classification rates defined above becomes:

$$\begin{cases} \text{False Acceptance} = 1.24\% \\ \text{False Rejection} = 0.12\% \end{cases} \quad (9)$$

TABLE 8

|  | Rejected | Indecisive | Accepted |
| --- | --- | --- | --- |
| Client - correct pass-phrase | 0.02 | 1.42 | 98.56 |
| Client - wrong pass-phrase | 0.23 | 99.76 | 0.017 |
| Impostor - correct pass-phrase | 64.73 | 32.70 | 2.56 |
| Impostor - wrong pass-phrase | 80.18 | 19.82 | 0.0002 |

Replacing the text-independent score by the UBM-normalized text-dependent score in the soft margin process therefore reduces the False Rejection rate by 79%.

Thus, in accordance with the present embodiment, a novel speaker-normalized text-dependent scoring evidencing robust behavior and improved results has been provided. Analysis of the behavior of text-independent and text-dependent scoring has shown that combining both scoring into a speaker-normalized text-dependent scoring improves speaker verification accuracy and also leads to a better discrimination between genuine target trials and playback attacks. The proposed speaker-normalized scoring which is computed as a likelihood ratio between text-dependent and text-independent speaker specific scores demonstrated significant improvement up to 88% in performance relative to the original UBM-normalized text-dependent scoring when considering client pronouncing a pass-phrase different from the prompted one as playback impostures.

A novel dual-scoring method for text-dependent speaker verification based on the HiLAM modeling architecture also shows improved speech verification achieving 1.24% of false acceptance rates of previous systems and 0.83% of false rejection rates of such systems. A binary decision tree is used to split the two-dimensional score space into three clusters corresponding to the three type of decisions, namely, accept, indecisive (or playback), and reject. By placing one logistic function at each node of the decision tree, the dual scores are mapped into a single confidence score.

Thus, it can be seen that a system and method for text-dependent speaker verification that overcomes drawbacks of prior methods and systems has been provided. While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A speaker verification method comprising:
   receiving an utterance from a speaker by an audio receiving device;
   determining a text-independent speaker verification score in response to the utterance using a processor coupled to the audio receiving device to determine the text-independent speaker verification score in response to a speaker-dependent text-independent Gaussian Mixture Model (GMM) of the utterance;
   determining a text-dependent speaker verification score in response to the utterance using the processor to determine the text-dependent speaker verification score in response to a continuous density Hidden Markov Model (HMM) of the utterance aligned by a Viterbi decoding;
   determining a Universal Background Model (UBM)-independent speaker-dependent normalized score in response to a relationship between the text-dependent speaker verification score and the text-independent speaker verification score using the processor, the relationship being based on a difference between the text-dependent speaker verification score and the text-independent speaker verification score; and
   determining speaker verification in response to the UBM-independent speaker-normalized score.

2. The method in accordance with claim 1 wherein the step of determining speaker verification in response to the UBM-independent speaker-normalized score comprises determining speaker verification in response to a dual-scoring soft decision margin combination of the UBM-independent speaker-normalized score and the text-dependent speaker verification score.

3. The method in accordance with claim 1 further comprising:
   determining a first threshold defined in response to a speaker-normalized score minimizing the False Acceptance (PFA); and
   determining a second threshold defined in response to a text-dependent speaker verification score minimizing the False Rejection (PFR).

4. The method in accordance with claim 3 further comprising determining a decision tree classification scoring function in response to the first threshold and the second threshold as applied to a plurality of speaker scores of the speaker in a scoring trial.

5. The method in accordance with claim 4 wherein the decision tree classification scoring function comprises a single dimensional confidence interval with three decision regions, and wherein the step of determining speaker verification in response to the UBM-independent speaker-normalized score comprises determining speaker verification in response to mapping the UBM-independent speaker-normalized score and a text-dependent speaker verification score to the three decision regions.

6. The method in accordance with claim 5 wherein the three decision regions comprise an accept decision region, an indecisive decision region and a reject decision region.

7. The method in accordance with claim 6 further comprising requesting a further speaker utterance in response to the speaker verification mapping the speaker UBM-independent speaker-normalized score and the text-dependent speaker verification score to the indecisive decision region.

8. A Universal Background Model (UBM) independent speaker verification method comprising:
   receiving an utterance from a speaker by an audio receiving device;
   determining a text-independent speaker verification score in response to the utterance using a processor coupled to the audio receiving device;
   determining a text-dependent speaker verification score in response to the utterance using the processor;
   determining a UBM-independent speaker-normalized score in response to a difference between the text-independent speaker verification score and the text-dependent speaker verification score using the processor; and
   determining speaker verification in response to the UBM-independent speaker-normalized score.

9. The method in accordance with claim 8 wherein the step of determining the UBM-independent speaker-normalized score comprises determining the UBM-independent speaker-normalized score in response to the difference between the text-independent speaker verification score and the text-dependent speaker verification score by determining a likelihood ratio between the text-dependent speaker verification score and the text-independent speaker verification score.

10. The method in accordance with claim 9 wherein the utterance comprises a prompted pass-phrase, and wherein step of determining the text-independent speaker verification score comprises determining the text-independent speaker verification score in response to the utterance and further in response to one or more pass-phrases different from the prompted pass-phrase and previously pronounced by the speaker as playback impostures.

11. The method in accordance with claim 9 wherein the step of determining the UBM-independent speaker-normalized score comprises determining a likelihood ratio $$S(\chi) = \log\left(\frac{L_{HMM}(\chi)}{L_{GMM}(\chi)}\right)$$

wherein $L_{GMM}(X)$ is the likelihood of the utterance X on the speaker-dependent text-independent GMM and $L_{HMM}(X)$ is the likelihood of X on the text-dependent Hidden Markov Model (HMM) aligned by a Viterbi decoding.

12. A dual-scoring text-dependent speaker verification method comprising:
   receiving a plurality of test utterances by an audio receiving device;
   determining a text-independent speaker verification score in response to each of the plurality of utterances using a processor coupled to the audio receiving device;
   determining a text-dependent speaker verification score in response to each of the plurality of utterances using the processor;
   determining a Universal Background Model (UBM)-independent speaker-normalized score in response to a relationship between the text-dependent speaker verification score and the text-independent speaker verification score using the processor, the relationship being based on a difference between the text-dependent speaker verification score and the text-independent speaker verification score;

mapping the UBM-independent speaker-normalized score and the text-dependent speaker verification score for each of the plurality of utterances into a two-dimensional score space in response to a score accept threshold and a score reject threshold;

splitting the two-dimensional score space into three clusters, the three clusters corresponding to accept scores, indecisive scores and reject scores; and defining a binary decision tree for speaker verification confidence score generation by identifying a logistic function at each node of the binary decision tree.

13. The method in accordance with claim 12 further comprising:

receiving an utterance from a speaker by the audio receiving device;

determining the text-independent speaker verification score in response to the utterance using a processor coupled to the audio receiving device;

determining the text-dependent speaker verification score in response to the utterance using the processor;

determining a UBM-independent speaker-normalized score in response to a relationship between the text-dependent speaker verification score and the text-independent speaker verification score using the processor; and generating a speaker verification confidence score corresponding to the utterance in response to performing the logistic function at each node of the binary decision tree to map the text-dependent speaker verification score for the utterance and the UBM-independent speaker-normalized score for the utterance onto the binary decision tree.

14. The method in accordance with claim 12 wherein the step of defining the binary decision tree comprises defining the binary decision tree for speaker verification confidence score generation, based on the HIerarchical multi-Layer Acoustic Model (HiLAM) binary tree modeling approach.

15. A system for speaker verification comprising:

an audio receiving device for receiving an utterance from a speaker and converting the utterance to an utterance signal; and a processor coupled to the audio receiving device for determining speaker verification in response to the utterance signal, wherein the processor determines speaker verification in response to a Universal Background Model (UBM)-independent speaker-normalized score by determining a text-independent speaker verification score in response to the utterance signal, the text-independent speaker verification score determined in response to a speaker-dependent text-independent Gaussian Mixture Model (GMM) of the utterance;

determining a text-dependent speaker verification score in response to the utterance signal, the text-dependent speaker verification score determined in response to a continuous density Hidden Markov Model (HMM) of the utterance signal aligned by a Viterbi decoding; and determining the UBM-independent speaker-normalized score in response to a relationship between the text-dependent speaker verification score and the text-independent speaker verification score, the relationship being based on a difference between the text-independent speaker verification score and the text-dependent speaker verification score.

16. The system in accordance with claim 15 wherein the processor determines the speaker verification in response to a dual-scoring soft decision margin combination of the UBM-independent speaker-normalized score and the text-dependent speaker verification score.

* * * * *

UNITED STATES PATENT AND TRADEMARK OFFICE
CERTIFICATE OF CORRECTION

PATENT NO.       : 9,489,950 B2
APPLICATION NO.  : 13/900858
DATED            : November 8, 2016
INVENTOR(S)      : Larcher et al.

It is certified that error appears in the above-identified patent and that said Letters Patent is hereby corrected as shown below:

On the Title Page

In Column 1, under "Foreign Application Priority Data", Line 1, delete "201204003" and insert --201204003-6--, therefor In the Claims In Column 15, Line 50, in Claim 3, delete "(PFA);" and insert --($P_{FA}$);--, therefor In Column 15, Line 53, in Claim 3, delete "(PFR)." and insert --($P_{FR}$).--, therefor Signed and Sealed this
Tenth Day of April, 2018

Andrei Iancu
*Director of the United States Patent and Trademark Office*